No. 775,312.                                      Patented November 22, 1904.

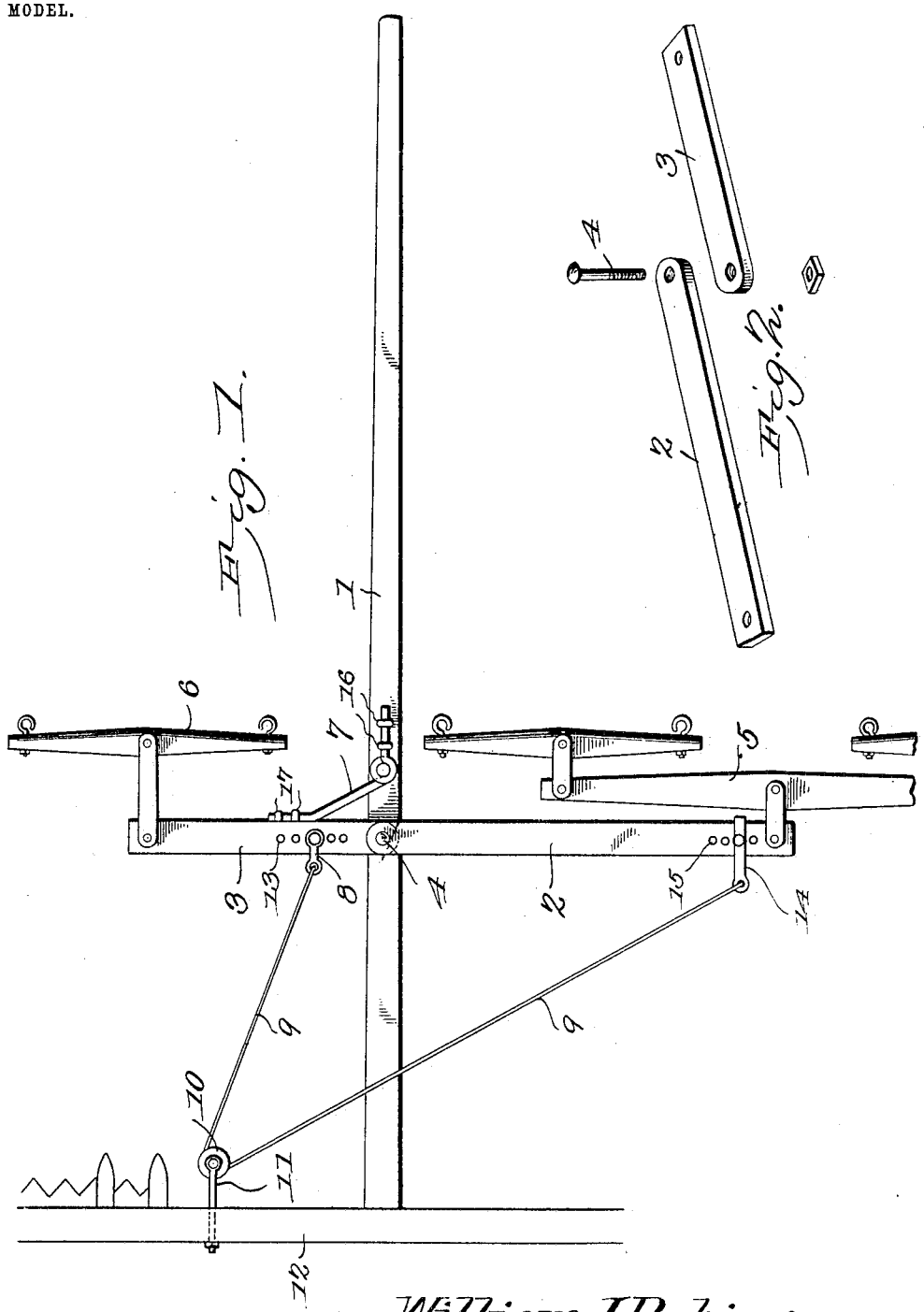

UNITED STATES PATENT OFFICE.

WILLIAM JAMES ROBINSON, OF AVON, SOUTH DAKOTA.

DRAFT-EQUALIZER.

SPECIFICATION forming part of Letters Patent No. 775,312, dated November 22, 1904.

Application filed September 7, 1904. Serial No. 224,171. (No model.)

*To all whom it may concern:*

Be it known that I, WILLIAM JAMES ROBINSON, a citizen of the United States, residing at Avon, in the county of Bonhomme and State of South Dakota, have invented a new and useful Draft-Equalizer, of which the following is a specification.

This invention relates to draft-equalizers, and has for its principal object to produce a simple and inexpensive device of this character which in practice will effectually overcome side draft and equalize the draft of two or more animals upon one side of the draft-tongue and a single animal upon the other side, thereby causing the plow, harvester, or other implement to move freely through or over the ground.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a plan view of a draft-equalizer embodying the invention. Fig. 2 is a perspective detail view of the evener-beams and pivot-bolt detached.

The improved device is attachable to any of the various forms of draft-tongues (represented at 1) and rigidly attached to a harvester, plow, or other implement to be transported and indicated at 12.

The improved device comprises two beams or levers 2 3, connected at their adjacent ends, as by a single pivot-pin 4, to the tongue 1, the beam member 2 being preferably about twice as long as the member 3.

The beam member 2 has a doubletree 5 pivoted to its outer end and the beam member 3 has a swingletree 6 pivoted to its outer end to provide for connecting two of the draft-animals upon one side and one upon the other side of the draft-tongue.

A tension-spring 7 is attached by one end, as at 16, to the draft-tongue in advance of the pivot-pin 4 and with the other end of the spring attached, as at 17, to the beam member 3 and exerting its force to hold the beam member yieldably in position relative to the tongue.

Connected to the framework 12 of the harvester, plow, or other implement to which the draft-tongue is attached, as by a clip 11, is a pulley 10, over which a cable or chain 9 leads, with the ends of the cable connected, respectively, to beam member 2 near its outer end, as by a clip 14, and to the beam member 3 near its inner end or adjacent to the tongue 1, as by a clip 8.

The beam members 2 and 3 are provided, respectively, with spaced apertures 15 and 13 to permit the clips 8 and 14 to be adjusted longitudinally of the beam members, as required to adapt the device to the varying weights and strengths of the draft-animals.

The tension-spring 7 will be strong enough to exert about one-half a horse-power, divided equally between the tongue and beam member 3 and holding the tongue away from the single horse hitched to the swingletree 6, and thus equalizing the side draft and straight draft on the grain or land side.

The clip 11 being set to one side of the tongue 1 and the cable 9 being connected to the longer beam member near its outer end and to the shorter beam member near its inner end, the leverage is in favor of the single horse, as will be readily understood, and the draft thereby effectually equalized and all side draft eliminated.

The spring member 7 is a very important feature of the invention and exerts a strong influence in controlling the movements and also in preventing rattling and displacement of the parts.

While the clip 11, carrying the pulley 10, will preferably be located at the grain or furrow side of the tongue, as shown, it may be arranged upon the stubble or land side of the same, if preferred; but this would not change the leverage or otherwise affect the operation adversely.

Having thus described the invention, what is claimed is—

1. In a draft-equalizer, a draft-tongue, a pair of draft-beams of unequal length pivoted to the draft-tongue, a spring acting between the shorter beam and said draft-tongue and exerting its force to move said tongue laterally away from said shorter beam, and means operating rearwardly of said beams for equalizing the draft applied thereto.

2. In a draft-equalizer, a draft-tongue, a pair of draft-beams of unequal length pivoted to the draft-tongue, a spring acting between the shorter beam and said draft-tongue and exerting its force to move said tongue laterally away from said shorter beam, a guide-pulley connected rearwardly of said draft-beams, and a flexible member engaging said pulley and connected by its ends respectively to said pivoted beams.

3. In a draft-equalizer, a draft-tongue, a pair of draft-beams of unequal length pivoted by their adjacent ends to said draft-tongue, a spring connected by its ends respectively to said tongue and the shorter of said draft-beams and exerting its force to move the tongue away from the same, a pulley connected rearwardly of said draft-beams, and a flexible member engaging said pulley and connected by its ends respectively to said shorter beam near its pivoted end and to said longer beam near its free end.

4. In a draft-equalizer, a draft-tongue, a pair of draft-beams pivoted at their adjacent ends by a single pivot-pin to said draft-tongue, a spring acting between the shorter draft-beam and said tongue and exerting its force to swing the free end of the tongue away from said shorter draft-beam, a clip connected for longitudinal adjustment to said shorter draft-beam near its pivoted end, a clip connected for longitudinal adjustment to said longer draft-beam near its outer end, a pulley connected rearwardly of said draft-beams, and a flexible member engaging said pulley and connected by its ends respectively to said clips.

In testimony that I claim the foregoing as my own I have hereto affixed my signature in the presence of two witnesses.

WILLIAM JAMES ROBINSON.

Witnesses:
J. O. SMITH,
BERNARD BRANDT.